United States Patent [19]

Holdner

[11] 4,253,823
[45] Mar. 3, 1981

[54] PROCEDURE AND APPARATUS FOR BAKING CARBON BODIES

[75] Inventor: Donald N. Holdner, Falardeau, Canada

[73] Assignee: Alcan Research & Development Limited, Montreal, Canada

[21] Appl. No.: 39,751

[22] Filed: May 17, 1979

[51] Int. Cl.[3] .................. F26B 9/12; F27D 15/02; F27B 7/00

[52] U.S. Cl. .................................. 432/18; 34/20; 432/83; 432/84; 432/192

[58] Field of Search .................. 432/18, 83, 84, 192; 34/20

[56] References Cited

U.S. PATENT DOCUMENTS

| | | | |
|---|---|---|---|
| 3,744,959 | 7/1973 | Nedopil et al. | 34/20 |
| 4,040,778 | 8/1977 | Black | 432/192 |
| 4,128,394 | 12/1978 | Naito et al. | 432/145 |

FOREIGN PATENT DOCUMENTS 2801698 10/1978 Fed. Rep. of Germany.

*Primary Examiner*—John J. Camby
*Attorney, Agent, or Firm*—Cooper, Dunham, Clark, Griffin & Moran

[57] ABSTRACT

In the baking of carbon anodes (for aluminum reduction cells) or the like, in so-called ring-type furnaces where green carbon bodies are deposited in pits, each of which is circumstanced successively for preheating stages, one or more baking stages, and cooling stages, while air travels in heat exchange relation through flues past a series of pits respectively undergoing such cooling, baking and preheating operations, improvement is effected by introducing water spray into the air as it flows past the pits at a cooling region. Such water, first as spray and then as vapor, increases the quantity of heat that can be absorbed by the air flow and also increases the heat transfer coefficients of the flue walls in the cooling regions, so as to provide recovery or removal of heat in greater amount or more rapidly. The vapor-containing air, advancing through the localities of baking fire in the flues and then the preheating regions, enhances the heat exchange between the gas and the flue walls and can permit higher baking temperature of the carbon bodies. A particularly important result is reduction in the overall time of the process (preheating, baking, cooling), and correspondingly in cost, e.g. as related to the production of aluminum.

Suitable apparatus is a ring-type furnace with nozzles for introducing water spray into the flues that run past the carbon-containing pits. The nozzles can be connected in a manifold across the parallel lines of pits, which can be shifted as such whenever pits are brought into and removed from an operating sequence.

17 Claims, 4 Drawing Figures

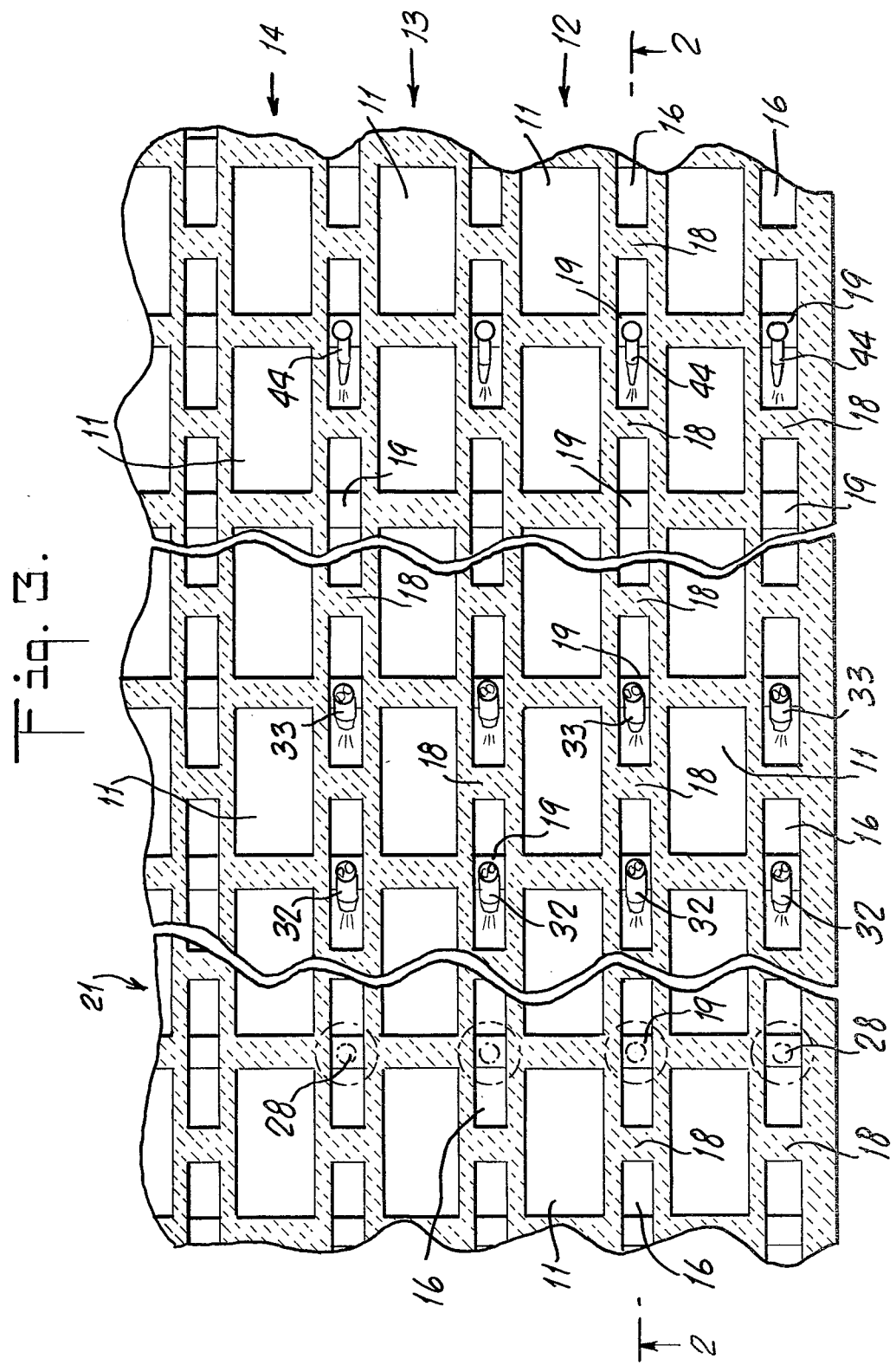

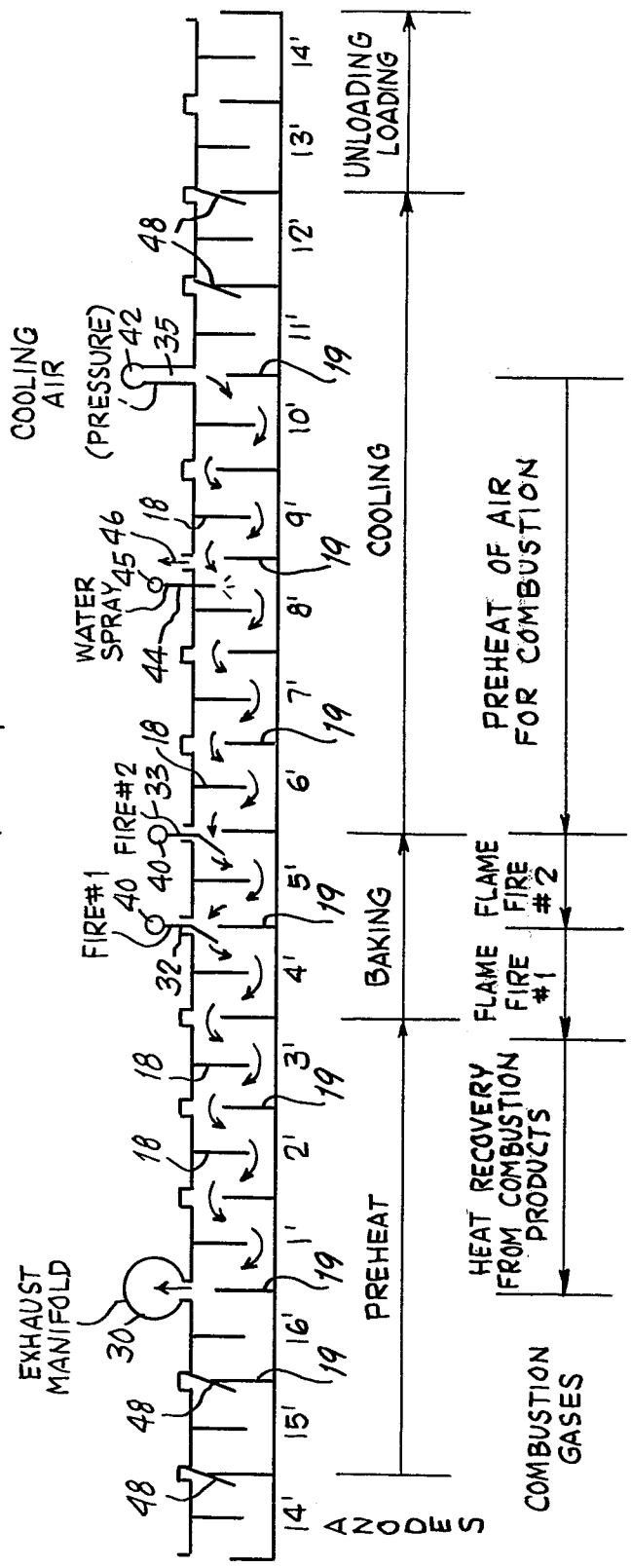

PROCEDURE AND APPARATUS FOR BAKING CARBON BODIES

BACKGROUND OF THE INVENTION

This invention relates to procedure and apparatus, e.g. furnace systems, for baking carbon bodies such as electrodes and components of electrodes, for use in molten electrolytes or for other electrical purposes. In an important specific sense, the invention is particularly concerned with the baking of carbon anodes, i.e. so-called pre-baked anodes, for conventional aluminum reduction cells wherein aluminum is electrolytically produced from alumina in a molten bath with accompanying reaction that progressively consumes the carbon. Carbon bodies of this sort are prepared of finely-divided carbonaceous solid such as petroleum coke, suitably calcined, or other carbon material equivalently purified, together with binder of the class of pitch and tar, the mixed mass being compressed to provide preliminarily coherent and self-sustaining bodies of rectangular, slab-like, block, brick or other desired shape, which require to be baked, e.g. at temperatures of about 1050° to 1250° C., to yield finished bodies of suitable hardness, firm coherence and impact strength for the intended handling and use, including resistance to thermal effects and erosion in molten alumina-salt baths.

So-called ring type baking furnaces are commonly used for the above operation, consisting of a honeycomb of rectangular refractory pits in which the carbons are baked, heat being applied to the carbons, for preheating and baking, and removed for cooling, by suitable gas flow through flues in the walls of the pits. In one conventional arrangement of such furnace, each open-topped pit can be about 0.5 to 1 m. in width, 3 to 5 m. long and 3 to 5 m. deep. Specifically, in small groups (e.g. 4 to 8) the pits are arranged side by side on a common level, with their long sides adjacent, each such group being called a section. The sections are arranged in a complete system, e.g. 16 to 80 in number, with the pits of each section being disposed endwise relative to the pits of the adjoining section or sections, so that the organization may provide from 4 to 8 rows with from 8 to 40 pits in each row in endwise succession, and with an equivalent series of pits arranged in parallel and connected by crossover flues so that the continuous ring may be completed. The flues being built in the longitudinal walls of each pit and being arranged for communication with the flues of the endwise adjoining pits unless deliberately blocked, the arrangement is such that each complete row may at a given time comprise one or preferably a plurality of long sets (say, 12 to 16 pits in each) of pits that succeed each other lengthwise, end to end.

Each such set, as defined at successive times in substantially continuous operation, can be considered a temporary baking unit, i.e. when the pits are loaded with carbon bodies. That is to say, three or four pits per row are subjected to preheating of green or unbaked bodies, two or three pits receive highest baking heat and six or seven are undergoing cooling, all by reason of the condition of the gas flowing in the sequence of flues along the pits, i.e. from the most cooled pit to the pit first subjected to preheating. Thus gas, preferably cold air, enters the flue system adjacent the last of the pits under cooling, passes the series of such pits and then the region of the final baking pits where high temperature heat, e.g. fire from burners, is injected into the gas stream; thereafter the very hot gas passes the preheating pits and is exhausted. For continuing operation, the circumstances of the pit-adjacent flue portions are altered intermittently: each 18 to 64 hours, the locality of fire injection is advanced a distance of one pit, concurrent with the direction of gas flow, and likewise the localities of air entrance and gas exhaust, whereby at each change a filled but unheated pit is added to and a pit with finished carbon bodies is removed from the sequence of pits or baking unit under treatment. In this way each filled pit is subjected to the entire series of steps, over a total period of many days.

In a practical furnace organization where the pits are arranged in sections of several pits each and many sections are disposed for lengthwise alignment of their pits, the complete structure provides in effect several rows of many endwise successive pits each, with heat-exchange gas flues, in effect, between the rows and along the outside rows. A plurality of temporary baking units can be arranged at any one time in each row, i.e. in succession, separated by several pits for which the flues are blocked and which are available for unloading baked and loading green carbon bodies. The flues have service ports adjacent the corresponding pits, which are blocked except when in use for entry of air or fire or for exhaust. Conveniently the fire burner means and the exhaust means, and if desired the air entry means, are arranged as manifolds crossing the array of rows and movable to successive positions along the array (including the return part of the ring), a number of such manifolds being provided whereby a number of successive temporary baking units can be set up in each row, and parallel such units in the several rows can be simultaneously advanced, section by section, as explained above.

Hence in each of the parallel working series or temporary baking units of pits as existing at any one time, the bodies in the pits next to the exhaust manifold are in the first stages of baking (preheating), those next to the fire manifold are in the final stages of baking and approaching their final baking temperature, while those near the end of the cooling section are cooled and ready to be unloaded. While the pits are of course stationary, each pit goes through all the stages in the cycle, which usually requires from about 10 to 30 days or more, a typical time being about 26 days for preheating, baking and cooling and for unloading and loading. Although in an overall sense the procedure is continuous, the baking capacity of a given furnace system is limited by the total time required to process each carbon body, and in the case of anodes for an aluminum smelter such capacity represents a very significant cost item in smelter operation.

Accordingly, it is important, if possible, to reduce the time for treating the carbon bodies and thus in effect produce more finished bodies per day. In the baking operation, the heating rate, especially for anode bodies, is important; thus in various furnaces heating rates average about 4° to 12° C./hour. Cooling the baked anodes (or other bodies) is generally not critical, and should be carried out as quickly as possible, to shorten the total cycle and achieve maximum production with a given furnace. Unfortunately, the cooling step is usually slow, chiefly because of the low heat carrying capacity of the cooling gas and low heat transfer coefficients associated with it.

A conventional mode of increasing the cooling rate is with forced air cooling, employing fans to pump large amounts of cold air into the last cooling sections. Since this is far too much to be utilized for combustion in the locality or localities of fuel injection for the baking fires, the hot air is largely returned into the building. This method has been found disadvantageous, notably in that large quantities of heat are simply exhausted into the atmosphere of the furnace building, and the so-extracted heat is lost. Dependent on the specific flue arrangement of the furnace, this type of extra cooling suffers in feasibility or efficiency; in a so-called horizontal flue furnace, the adverse effect of the forced air supply on the fire may require the fans to be placed too far from the fire to be of great use, while in vertical flue furnaces multiple fans can be used but if placed very close to the fire for maximum cooling, the correspondingly great amount of extracted heat is non-recoverable.

SUMMARY OF THE INVENTION

The present invention is predicated on the discovery that by introducing small amounts of water, i.e. as water spray, into the cooling air or other gas flow which is passing the structures that contain baked carbon bodies, substantial improvement is achieved, especially in the cooling process. The primary practical result is that with the cooling gas so treated the baked carbon bodies can be brought to a desired, relatively low temperature in a significantly shorter time, or alternatively, can be brought to a much lower temperature than was heretofore attainable in a predetermined interval.

The operation, and the apparatus for carrying it out, essentially provide for spraying water into the flues of the furnace assembly. Inasmuch as the cooling operation very promptly contributes heat to the passing gas, the water spray is converted, with corresponding promptness, to water vapor—to which the novel effect of the present process is therefore essentially attributable. The incorporation of water into the cooling gas, e.g. air, in the amounts herein contemplated has the advantage that considering a given mass of water or air on heating from 0° to 1000° C., the introduced water can absorb four times the amount of heat (including heat of vaporization) that air can. The capacity of the water vapor as a radiation absorber also substantially increases the flue wall heat transfer coefficient. Hence, introducing a small amount of water sprayed into the flue, which in effect replaces some of the excess air, substantially increases the heat carrying capacity of the cooling gas and the flue wall heat transfer coefficients in the cooling sections.

In consequence, the cooling process is greatly improved without any negative effects on the atmosphere in the furnace building or on the operation or efficiency of the furnace. Indeed, by reason of the greater heat recovery, some increase in operating efficiency is logically obtained.

The air and its water vapor content in furnaces where such vapor-containing air constitutes the gas in the flues continue, after use for cooling, to traverse the baking and preheating flue sections and may there also contribute to improvement in the actual baking operation. That is to say, the gas (air) entering the baking zone of the flue system carries water vapor which represents and contains latent heat extracted from the baked carbons in the cooling zone. Because the specific heat of the air-water vapor mixture is slightly higher and the emissivity considerably higher, than those of air alone, the rate of heat exchange between the gas and the refractory partitions, i.e. the flue walls, is increased. A further result is that a higher baking temperature of the carbon bodies is thus attainable. Briefly stated, a saving in energy can be expected, for achievement of the same baking results.

The performance of the process is relatively simple, namely by introducing a suitable spray of cold water into the gas, i.e. air, in the flues along the cooling section of the portion of the furnace in use for the baking (and cooling) sequence at any given time. This can be achieved, for example, with a water spray manifold arranged to be inserted through the service ports of the flue system at appropriate localities, provision being made for relocating such spray manifold at further, different localities, when the firing nozzle and other service equipment advance stepwise in the manner explained above.

The foregoing and other features of the invention are explained in more detail in the description below, with illustration in the accompanying drawings.

BRIEF DESCRIPTION OF THE DRAWINGS

FIG. 3 is a fragmentary horizontal section on line 3—3 of FIG. 2.

FIG. 4 is a schematic drawing of a flow diagram of preheating, baking and cooling operations in the furnace organization of FIGS. 1, 2 and 3, as especially related to the flow of cooling gas, burner flame and preheating gas, for heat exchange with the baking pits. Flow charts are shown for the sequence of treating the carbon bodies and for the sequential utilization of the gas flow.

DETAILED DESCRIPTION

Figure 1:
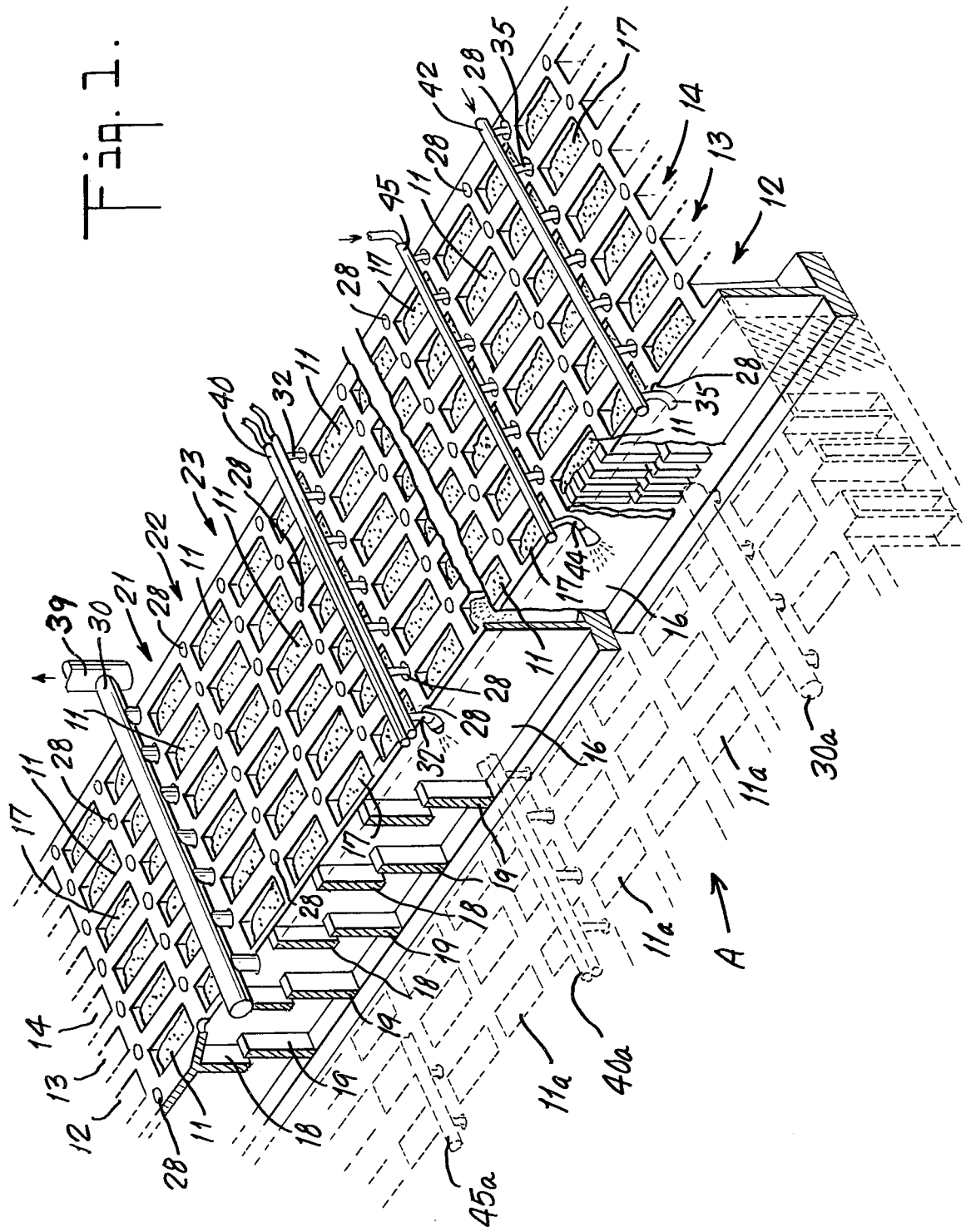
FIG. 1 is a simplified, fragmentary, perspective view of a furnace arrangement (horizontal flue type, in this example) for baking carbon anodes or the like, utilizing an embodiment of the invention, with some conventional furnace details omitted for clarity, but with an indication of the parallel, return half of the ring.

Referring to the drawings, a furnace organization for baking carbon anodes may comprise a multiplicity of rectangular, open top pits 11, defined by a refractory wall structure surrounding the pits, which are aligned in long, parallel rows as at 12, 13, 14. The lengthwise wall structure between the rows is hollow and conveniently provides a flue as at 16 which passes each of the pits 11 in the adjoining row 12, in heat exchange relation, but arranged to have a tortuous path for the flow of air or gas lengthwise, by reason of suitable baffles, such as the upper baffles 18 and the lower baffles 19.

Each transverse set of pits 11, such as indicated at 21, 22, 23 in FIG. 1, where the pits have their long sides adjacent but separated by the hollow flue walls, is conveniently called a section. Thus, the furnace organization consists of a large number of sections (each containing several pits 11 side by side) arranged longitudinally so that there are at least several long rows (e.g. 12, 13, 14) of pits past which flues 16 extend for cooling, preheating and the like, whereby the flow of gas passes in heat exchange relation with the adjoining pit walls and, in effect, with the contained carbon anode bodies in various stages of heating, baking and cooling.

As will be understood, the anode bodies are preformed, for example of suitable size and shape for so-called prebaked anodes to be used in aluminum reduction cells of the type employing such electrodes. They are composed of finely divided carbon, for example calcined petroleum coke, with pitch and/or tar or other carbonaceous binder. They may, of course, also include some scrap carbon particles, either unbaked or baked. The carbon bodies to be baked are shaped by compression into desired sizes and configurations, while the mutual dimensions of the bodies and the furnace are usually such that each pit can accommodate several carbon bodies, appropriately loaded. For convenience, the bodies are supported in the pits by particulate, thermally conductive, packing material 17, e.g. granular carbon such as fine coke dust or the like. Such material supports the bodies in their green state and through the entire operation, so that they bake into the proper configuration and may easily be dug out when the baking sequence is over.

After the bodies have been baked hard and cooled, they are removed, ready for insertion of the necessary mounting studs or rods, for suspension in the aluminum reduction cells. As will be understood, the baking operation effectively drives out volatile matter and carbonizes the binder, yielding essentially monolithic bodies of carbon.

Referring further to the furnace organization, the long flues 16 which pass the succeeding baking pits of each row have service openings in the roof as at 28, above the refractory baffles 19, such that various elements are insertable through or at these openings for introducing air, heating fire and the like, or for attaching exhaust ducts. Thus, as in FIGS. 1, 2 and 4, each linear flue adjacent a functioning row of furnace pits 11 may have connection to an exhaust manifold 30, shown across a section 1' of pits, considering certain pits (or sections) along a longitudinal row as temporarily numbered from 1' to 16' (FIG. 4.).

Fuel burners 32 (and 33, if desired) may be inserted through the port or ports 28 where highest temperature of baking is to be reached, whereby a projected flame of oil, gas or the like is directed into the flue 16, through which hot combustion gases are then drawn to the exhaust 30. In some instances as shown (e.g. at 4' and 5'), it is preferable to have two such burners projected into successive service ports of the flue along the row of pits, e.g. as indicated at 32 and 33 of FIGS. 2, 3 and 4. As will be understood, the primary heat is effected by the first burner 32, while further heat to each loading of carbon bodies is effected with the burner 33, i.e. when the positions of the exhaust and burners are periodically changed as above explained. Of course, it is feasible to operate with a single burner, for each operating sequence of pits, providing sufficient time is allowed for the delivery of heat to the preshaped blocks, as indicated for simplicity in FIG. 1; or more burners may be used, e.g. up to four.

The pits 6' to 10' in each row, which extend from the fires upstream of the flue draft, contain baked carbon blocks in a sequence of stages of cooling, as by virtue of air introduced through an air inlet 35 in an appropriate service port of each longitudinal flue, e.g. at pit 10'. Thus, the air so supplied in the flue for cooling provides oxygen for supporting combustion at the burners 32 and 33, and passes along as very hot flue gas, while preheating the unbaked bodies in pits 3' to 1', to the exhaust manifold 30 where it is drawn out under substantial suction by and through a suitable blower and stack, not shown.

Figure 2:
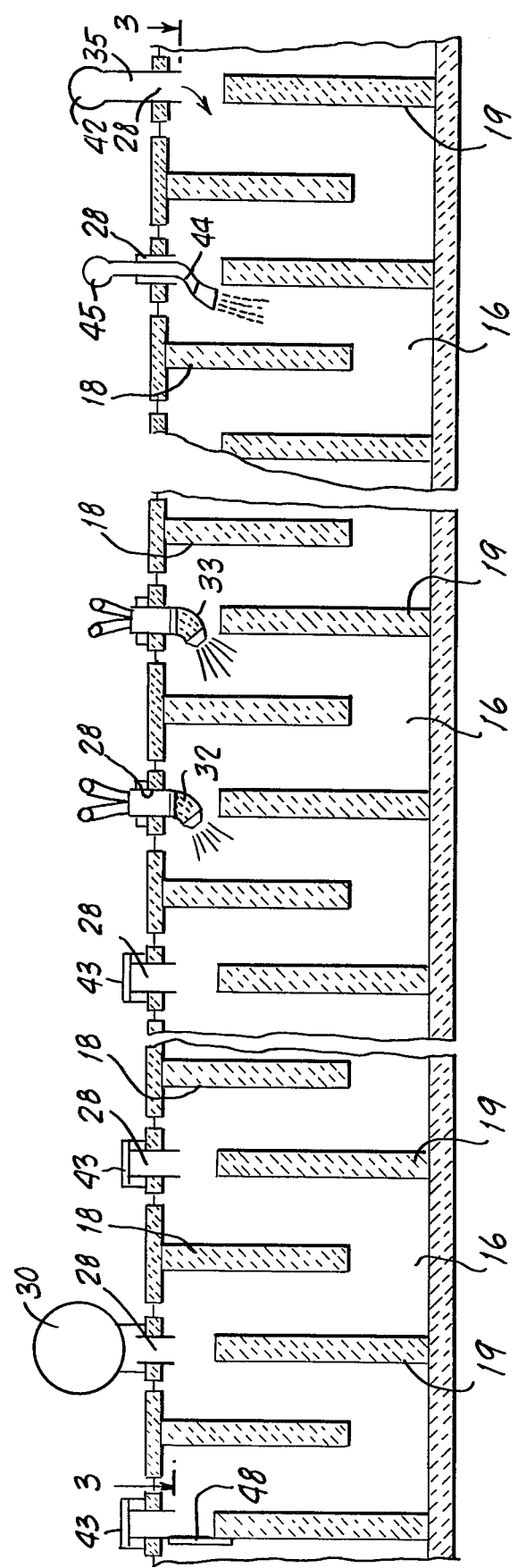
FIG. 2 is a partial, longitudinal, vertical section through a heating and cooling system of the furnace, seen as along the first side of FIG. 1, or on line 2—2 of FIG. 3.

Inasmuch as it is convenient to perform the baking and cooling process simultaneously along several rows of pits, the various functioning devices are arranged as manifolds and are movably supported. Thus, the exhaust 30 extending to a duct 39 (and thence to blower and stack) is arranged as a manifold which can be picked up and moved to the openings 28 for the next section of pits, when desired. Similarly, the fuel burners are supplied by manifold structures indicated at 40, e.g. that lead fuel, such as oil or gas, and primary air, to the several burners 32 or 33. As will be understood, the initial supply of air, as indicated at 35, may be supplied under pressure by a manifold 42, again arranged to be moved as a whole lengthwise of the assembly of sections, so as to inject the air into each desired further set of service openings 28. Alternatively, the ports 28 may simply be left open to enable atmospheric air to be induced in the flues, the pressure within which being then always below atmospheric, i.e. with no forced air cooling. It will be understood that when nothing is to be introduced or removed through a given service port 28, the same can be closed as with a cap 43 (FIG. 2; not shown in FIG. 1).

The organization, as explained hereinabove, is such that the exhaust, fires and air inlets are progressively advanced along the row of pits, whereby the initial preheating stage 1' is moved to the next pit to the left (freshly loaded with green carbon bodies), while the situation of other pits in the line is likewise changed, as by movement of the burners 32 and 33, and the air inlets 35, to successive positions along the flue. In this fashion, fresh, unbaked carbon bodies are loaded into successive pits to the left of the array in FIG. 1 (at 1' to 10' in FIG. 4), and baked and cooled bodies are successively unloaded from pits in the lower right-hand region of FIG. 1 (at 12' to 14' in FIG. 4), thus providing an essentially continuous operation.

In accordance with the present invention, the furnace system incorporates a plurality of water-spray nozzle devices 44 introduced into suitable ports 28 of the flues. These nozzles are supplied by the transverse manifold 45 so that a spray of water is injected into the air traversing each flue, and such moisture is thereby carried along the flue by the air. An arrangement presently considered advantageous is to inject the cooling air at a distance from the second firing section (e.g. 5') equal to about six sections or more, with the cooling air propelled by a suitable fan or blower (not shown) and this under pressure, toward the burner sections, as will be apparent in FIG. 4. Under such circumstances, it appears presently preferable to introduce the water spray at some distance from the air injection, toward the burner location, i.e. for example at 8', a distance of three pit sections (somewhat more than half way) toward the air inlet, as shown in FIG. 4.

Desirably, some of the introduced air may be allowed to escape at about the same locality (e.g. at 46), if required to avoid an excess of air at the point of combustion of the burners 32 and 33. In other instances, the air may indeed be introduced with little or no supplemental pressure at the inlet points 35, i.e. relying solely on the forced draft from the exhaust manifold 30. In any case, the object is to provide a certain amount of water spray, whereby water droplets, or indeed water vapor, will be present in the gas as it passes at least two and advantageously three or more pit sections containing hot, baked bodies. Each spray nozzle 44 is preferably designed to project a fan-shaped spray having a suitable angle, say 60° to 100°, between its emerging sides, as for example 94°, and is so aligned as to minimize direct impingement of water on the refractory walls of the flues.

To explain the operation of a furnace system as shown, it will be assumed that each row 12, 13, 14 (FIG. 1) comprises a large number, e.g. up to a total of 30 or 40, of the pits 11, extending for a considerable distance both to the left and the right of FIGS. 1 to 4. In pits identified by the sections 1' to 10' of FIG. 4, the packed carbon anodes are undergoing successive stages of the process: being preheated to successively higher temperatures in pits 1', 2' and 3'; being heated to and at baking temperature in pits 4' and 5'; and being cooled to successively lower temperature in pits 6', 7', 8', 9' and 10'. Green (unbaked) bodies have been or are being loaded in pits to the left of pit 1', i.e. in pits 16', 15' and so on, while baked (finished and cooled) bodies have been or are being unloaded in pits 11' to 14'. It will be understood that each entire row may accommodate several separately-functioning sequences 1' to 10', with the function or circumstances of each pit being changed by one step at appropriate intervals.

Thus, for example, after a selected time of operation in the manner given in FIGS. 1 and 4, the exhaust manifold 30, fire nozzles 32 and 33, water sprays 44 and air injection manifold 42 are each moved to the left by a distance of one pit, i.e. each to the next port 28 along the flue sequence. Flue closure baffles 48 at the ends of the sequence are also appropriately removed and replaced by one step, to re-establish the same number of flue sections for air or gas passage between the ends of the newly constituted baking unit or sequence. Hence, after such shift, the fresh, green bodies in the pits at 16' begin to be preheated by hot gas in the adjacent flue sections, the already much preheated bodies in the pit at 3' begin to be highly heated by the newly located fire 32 in the flue, the bodies baking in the pit at 4' continue to be baked by the flue 33, while the baked bodies in the pit at 5' begin to be cooled by the flow of air and water vapor coming from the flue line past pits 6' to 9'. Then or after another advance of functions, the baked bodies in the pits at 11' or 12' are unloaded, and the succeeding pits, e.g. 13', 14', can be reloaded with unbaked bodies, to be subjected to a like complete sequence (not shown) by reason of correspondingly advancing instrumentalities (exhaust, burners, water spray, air injection) in each flue line, i.e. moving up from a region to the right. In this fashion, several complete cycles of multi-step treatment move regularly along each row, to achieve what is essentially a continuous process, with green anode bodies received and baked anodes delivered at regularly advanced localities along the row. As will be understood, suitable adjustment of firing times and cooling intervals are made as needed, for pits (not shown) at the extreme right hand end of each row, so as always to achieve sufficient preheating and baking, and sufficient cooling, the carbon bodies there.

It will be understood that each of the manifold systems 30, 40, 45 and 42 is designed to be lifted and replaced bodily, and to be moved progressively from section to section along the rows, to turn at the ends of the furnace, and to move in the opposite direction along the adjacent parallel half of the furnace, for the sequential stepwise operation as described above. For accurate control of the procedure, temperature measuring means, e.g. thermocouples (not shown), may be inserted in each flue line at suitable places, as in the path of preheating gas and in the path of cooling gas. In any selected scheme of operation, the times of shift of the several means for effecting the introduction of air or gas, water and fire, and the exhaust of gas, are suitably coordinated with the number of pits in each functioning sequence and the weight of carbon bodies in each pit, to achieve desired results of preheating and baking, with sufficient cooling.

The practice of the invention, involving the described water spray, is found effective with relatively small amounts of water, for instance about 0.1 to 0.5 kg of water per kilogram of carbon production, calculated approximately for a multiple-row furnace as the total amount of water injected in a single flue during the interval between shifts of the several manifolds, measured against the weight of baked carbon in a single pit. The water is effectively sprayed in liquid state, and is understood to be promptly converted to vapor as it is carried by the air along each flue; although it could conceivably be injected as vapor, the absorption by the water of heat of vaporization contributes desirably to the cooling function.

By way of an example, in a plant test using a furnace of the type herein described, water was injected into the cooling flues according to the configuration of FIG. 4, i.e. including a nozzle 44 adjacent the third pit from the region of the second fire 33. The water thus consumed was 0.23 kg per kg of carbon production. After 210 hours of cooling, e.g. when the fire 33 (and other devices) had advanced by 5 stages of slightly over 40 hours each, so that hot anode bodies in original section 6' had completed sufficient cooling to become the equivalent of section 10' in FIG. 4, and had been reduced from an average baking temperature of about 1100° C. to about 400° C., the vapor in the stream of air traversed the three hottest sections, with essentially air alone in the other two sections. Anode bodies cooled in the same sequence, e.g. a parallel row of pits, but without any water injection, only reached a temperature of 510°, i.e. after the same 210 hours of cooling with air alone.

As another example, a further plant test was made, which lasted for three months, in a furnace similar to the one described. Cold, filtered water was injected at a pressure of 1.4 kg per cm$^2$ into the cooling flues adjacent each of three pits, i.e. of a section which was the third cooling section from the fires as shown in FIG. 4, other circumstances (including forced air at all times) being as there indicated. The sprays were advanced about every 40 hours at the same time as the fires. The baked anodes were cooled through the entire sequence from an average baking temperature of about 1,325° C. for a total average period of about 200 hours, i.e. in each of several baking cycles. About 0.38 kg of water was used per kg carbon production. At the end of such time, they were ready for discharge and had a temperature approximately 140° C. lower than that of control anodes similarly baked but cooled with forced air only, being a mean of 390° C. compared with 530° C. Hence, the results were distinctly superior with the air containing spray or vapor; with air cooling alone, further sections would be needed to reach the same low values of temperature, or correspondingly a time of 30 to 60 hours. This saving of time is very advantageous for the throughput or production rate of a given furnace.

In this example, other temperature comparisons were measured at the baking stage: the mean final baking temperature of the test anodes was increased by about 17° C. and the temperature of the adjacent refractory lining was approximately 20° C. lower.

The invention has the proven effect in the cooling cycle of improved efficiency, attaining lower temperature and requiring less time. Advantage is thus taken of the superior properties of water vapor as a radiation absorber, together with higher heat capacity than that of air, all as explained hereinabove. Likewise, as the vapor-containing air traverses the combustion locality, and indeed as burned flue gas, and on into the preheating zone, more latent heat is carried because of the water vapor, and the emissivity is raised with consequent increase of the rate of heat exchange between the gas and the refractory partitions. Hence, anode cooling and heat recovery may be enhanced.

It is thus contemplated that water is dispersed, as water spray or vapor, into the air or gas traveling in the furnace flue system, and is advantageously maintained in such dispersion, at least ultimtely as vapor, throughout the path of such gas at least from an intermediate locality of the cooling zone. Normally the water content of the gas can be about 0.1 kg per $M^3$ (NTP), preferably 0.05 to 0.2 $kg/M^3$, or even in the range 0.02 to 0.3 $kg/M^3$. As will be understood, baking temperatures for carbon anodes or the like can preferably be in the range 1050° to 1250° C., or more generally in some cases, 1000° to 1400° C.

The invention may be used alone or in conjunction with forced air cooling, and is applicable to horizontal-flue ring furnaces as herein illustrated, but also to other systems such as so-called vertical-flue furnaces, which are well known, as will now be readily appreciated.

In the latter type of furnace, the gas, for cooling or heating, passes through flues vertically (downward) along four sides of the enclosure pits, having crossed the top of each pit (through a space constituting a part of the flue system), and travels under the pits and to the next section through an intermediate upward duct. The sections are arranged in linear succession along the two parallel parts of the ring layout and provision for supplying air, water spray, fueled fire and exhaust air intermittently advanced along the ring as described above so that the stated steps of loading, preheating, baking, cooling and unloading are sequentially performed, and the improvement of introducing water spray or vapor according to this invention is effectuated, in essentially the same manner as in the horizontal flue furnace.

As will be seen in the specific furnace of FIG. 1, the parallel series of sections constituting the other part of the ring is indicated in fragmentary, phantom fashion at A, with the pits 11a aligned in rows identical to the described series of pits 11 and with identical, movable manifolds partly shown, e.g. for water spray 45a, fuel 40a and exhaust 30a, there being crossover flues (not shown) at the extreme ends of the furnace system, as is usual.

It is to be understood that the invention is not limited to the specific steps, operations and means herein described and shown, but may be carried out in other ways without departing from its spirit.

I claim:

1. In procedure for baking carbon bodies for electrical use, as performed in furnace apparatus having wall structure for enclosing such bodies in sequence and having flue means disposed externally of said wall structure and arranged for travel of gas past cooling and heat-applying localities in succession for heat exchange through said wall structure between the flue means and the enclosed, hot, baked bodies at a cooling locality, said procedure including introducing cooling gas into the flue means and advancing said gas in the flue means past said cooling and heating localities: the improvement which comprises introducing and dispersing water in said cooling gas as droplets or vapor so that the gas carries said dispersed water as it traverses the flue means at said cooling locality upstream of the heating locality in the course of gas flow, for enhancing heat exchange between the cooling gas and said hot, baked bodies.

2. In procedure for baking carbon bodies for electrical use, as performed in furnace apparatus having wall structure enclosing such bodies in sequence and having flue means disposed externally of said wall structure and arranged to provide a path for travel of gas past cooling, baking and preheating localities in succession for heat exchange through said wall structure between the flue means and the enclosed bodies including the hot, baked bodies at a cooling locality, said procedure including introducing gas first as cooling air into the flue means and therein advancing said gas past said cooling, baking and preheating localities for first cooling the hot, baked bodies: the improvement which comprises introducing and dispersing water into the cooling air as said air passes the enclosed hot, baked bodies upstream of the baking locality in said gas flow path, for enhancing heat exchange between the air and said hot bodies.

3. Procedure as defined in claim 2, which includes introducing burning fuel into a further point of said path at a baking locality for heating adjacent enclosed bodies to baking temperature, conducting said air in continuing travel along said path in the flue means to be heated by the burning of fuel therein, and thereby to become gas from combustion, and conducting the resulting hot gas of combustion in continuing travel further along the path for supplying heat to the enclosed bodies to be preheated, said hot gas during and after said combustion continuing to contain water dispersed as vapor, for enhancing heat transfer from the gas in baking and preheating the bodies.

4. Procedure as defined in claim 3, wherein the heat introduced in the gas by the cooling operation and by the combustion is effective to raise the enclosed bodies being baked to baking temperature of about 1000° to 1400° C., and the effect of the air cooling including the water-vapor-containing air, on the bodies enclosed at the cooling locality, is to reduce the temperature of said last-mentioned bodies to about 500° C. or less.

5. Procedure as defined in claim 2 which includes introducing ignited fuel into said path where the enclosed bodies are to be baked, said cooling air being caused to continue along said path for supporting combustion of the fuel, and said air continuing to contain said water as vapor, for enhancing delivery of baking heat to the bodies from the burning fuel.

6. Procedure as defined in claim 5 wherein hot gas from the combustion of said fuel continues to travel along said path past enclosed bodies to be preheated thereby, said hot gas continuing to contain said vapor which enhances the heat emissivity of the gas.

7. Procedure as defined in claim 6, which includes withdrawing the gas in said path therefrom after passing the locality of enclosed bodies being preheated, the operation of said withdrawal being effective to propel the gas, including water vapor therein, along said path from the cooling and past the baking and preheating stages, for exhaust.

8. Procedure defined in claim 7, as performed in apparatus having enclosure structures arranged in a linear series adapted to include an operating sequence of enclosures for preheating, baking and cooling along said path, wherein at any time one or more enclosures being loaded with unbaked bodies exist beyond the preheating end of the operating sequence of enclosures loaded with bodies under treatment, and wherein at desired times the localities of withdrawal of gas, introduction of burning fuel and introduction of air and water are advanced along the path by a distance of one enclosure in the direction toward the preheating end of the sequence, so that enclosures at the preheating end of the sequence, filled with untreated bodies, and at the cooling end, filled with cooled bodies, are respectively added to and removed from the operating sequence.

9. Procedure as defined in claim 2 as performed in apparatus wherein said hot baked bodies are enclosed for cooling in a series of enclosures past which said path of said flue means conducts the air, said water being introduced and dispersed by spraying it into the air traversing said path.

10. Procedure as defined in claim 9 wherein said series of enclosures for cooling the hot bodies includes at least three such enclosures past which the air travels in a direction toward and past the bodies closest to the baking step, said water being sprayed into the air at a locality such that the air containing dispersed water passes at least two enclosures before reaching the baking step.

11. Procedure defined in claim 10 wherein air is introduced under pressure into said path to flow therein toward the baking step, at a locality not closer to said step than a distance equal to at least three enclosures.

12. Procedure as defined in claim 2 wherein said water is dispersed, as droplets or vapor, in the air in such amount that as said air completes its travel for cooling past the enclosed hot bodies it contains 0.02 to 0.3 kg/$M^3$ (NTP) of water.

13. Procedure as defined in claim 12 wherein ignited fuel is introduced into said gas path where the enclosed bodies are to be baked, said cooling air continuing along said path for supporting combustion of the fuel and continuing to contain water vapor, in an amount of 0.05 to 0.2 kg/$M^3$ (NTP).

14. In procedure for baking carbon bodies for electrical use, as performed in furnace apparatus having a series of structures enclosing such bodies for preheating, baking and cooling in sequence and having flue means disposed externally of said structures and arranged to provide a path for travel of gaseous fluid for heat exchange between the flue means and the bodies in the structures to effectuate cooling, baking and preheating operations in series opposite to said sequence, along said path, said procedure including introducing cold gas into said path to travel past structures holding hot, baked bodies, then continuing flow of said gas past a structure or structures containing preheated bodies, while introducing heat into said gas thereby baking said last-mentioned bodies, and thereafter continuing flow of said heated gas past structures containing cold, unbaked bodies for preheating said cold bodies: the improvement which comprises spraying water into the aforesaid cold gas which is the gaseous fluid as applied for cooling at structures holding hot, baked bodies, to enhance the effective heat exchange between said gaseous fluid and carbon bodies that are enclosed in said series structures and are to be preheated, baked and cooled.

15. Procedure as defined in claim 14 in which the amount of water introduced into the gas is about 0.1 to 0.5 kg per kilogram of baked and cooled carbon produced.

16. In a furnace for baking carbon bodies which has a series of enclosing structures adapted to hold such bodies, at least one said structure having heating means for baking carbon bodies held therein and a plurality of other such structures being arranged in a sequence to hold baked bodies for cooling, and flue means abutting said structures and connected in series for conducting cooling gas past and in heat exchange relation to the structures of said sequence, the improvement comprising means for spraying water into said flue means abutting one of said cooling structures whereby the cooling gas as it passes said structures of the sequence carries water droplets or vapor.

17. A furnace as defined in claim 16 which includes a further plurality of said structures arranged in another sequence to hold unbaked bodies for preheating, said flue means extending also in abutment with said further structures and being disposed to conduct the gas, beyond the cooling structures, in heat exchange relation with the body-baking structure and with said further sequence of structures, said heating means comprising means for introducing burning fuel into said flue means near the baking structure, said flue means being arranged to conduct gaseous fluid in continuous flow past the sequence of cooling structures, the burning fuel and the sequence of preheating structures, while containing water dispersed as droplets or vapor.

* * * * *